(12) United States Patent
Miyashima (10) Patent No.: US 12,354,449 B2
(45) Date of Patent: Jul. 8, 2025

(54) SELF-CHECKOUT DEVICE (71) Applicant: Toshiba Tec Kabushiki Kaisha, Tokyo (JP)

(72) Inventor: Atsushi Miyashima, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/742,641

(22) Filed: Jun. 13, 2024

(65) Prior Publication Data
US 2024/0331510 A1 Oct. 3, 2024

Related U.S. Application Data (63) Continuation of application No. PCT/JP2022/041880, filed on Nov. 10, 2022.

(30) Foreign Application Priority Data

Jan. 24, 2022 (JP) ................. 2022-008895

(51) Int. Cl.
G07G 1/00 (2006.01)
(52) U.S. Cl.
CPC .................. G07G 1/0018 (2013.01)
(58) Field of Classification Search
CPC .................................... G07G 1/0018
USPC ....................................... 235/383
See application file for complete search history.

(56) References Cited

U.S. PATENT DOCUMENTS

| 9,824,547 B2 | 11/2017 | Baitz et al. |
| 2002/0170782 A1 | 11/2002 | Millikan |
| 2011/0114727 A1 | 5/2011 | Matsuhisa et al. |
| 2011/0192900 A1 | 8/2011 | Terahara et al. |
| 2016/0188942 A1 | 6/2016 | Good et al. |
| 2019/0272715 A1 | 9/2019 | Yajima |

FOREIGN PATENT DOCUMENTS

| CN | 102147946 A | 8/2011 |
| CN | 204680118 U | 9/2015 |
| EP | 3040954 A1 | 7/2016 |
| JP | 3631725 B2 | 3/2005 |

(Continued)

OTHER PUBLICATIONS

International Search Report (ISR) and Written Opinion mailed Dec. 20, 2022 in International Application No. PCT/JP2022/041880, with Translation of the ISR, 9 pages.

(Continued)

*Primary Examiner* — Daniel A Hess
(74) *Attorney, Agent, or Firm* — Kim & Stewart LLP (57) ABSTRACT A self-checkout device of an embodiment includes a bagging stand, a pair of pillars, a beam, a user interface terminal, and one or more brackets. The bagging stand includes a table and a scale that weighs a load placed on the table. The pair of pillars is installed on the bagging stand with a longitudinal direction thereof oriented vertically, and at least one outer surface of the pair of pillars is configured with a split exterior member that is splittable into a plurality of pieces in the longitudinal direction. The beam connects upper ends of the pillars. The user interface terminal is mounted on the beam. The one or more brackets receive attachment of an external device, and the bracket is positionally interchangeable with a part of the split exterior member.

5 Claims, 8 Drawing Sheets (56) References Cited

FOREIGN PATENT DOCUMENTS

| | | |
|---|---|---|
| JP | 2007-226498 A | 9/2007 |
| JP | 2011-164762 A | 8/2011 |
| JP | 2019-153163 A | 9/2019 |
| JP | 1684313 S | 4/2021 |
| JP | 1684314 S | 4/2021 |
| JP | 1701777 S | 12/2021 |
| JP | 1701795 S | 12/2021 |

OTHER PUBLICATIONS

Notice of Reasons for Refusal (Office Action) dated Apr. 15, 2025 in corresponding Japanese Patent Application No. 2022-008895 with English machine translation (6 pages).
Extended European Search Report mailed Apr. 16, 2025 in European Patent Application No. 22922050.4, 10 pages.

SELF-CHECKOUT DEVICE

CROSS-REFERENCE TO RELATED APPLICATIONS

This application is a continuation application of International Application No. PCT/JP2022/041880, filed Nov. 10, 2022, which designates the United States, and which claims the benefit of priority from Japanese Patent Application No. 2022-008895, filed Jan. 24, 2022, the entire contents of which are incorporated herein by reference.

FIELD

Embodiments described herein relates generally to a self-checkout device.

BACKGROUND

Conventionally, a self-checkout device for a customer to register and pay for a product by himself/herself has been known. In a conventional self-checkout device, a camera or a scanner for reading product information and a printer for issuing a receipt are fixed at specific positions on the device, and adjustment such as changing an installation height cannot be performed.

A height of a customer that is an operator who operates the self-checkout device varies, and a height range in which the customer feels easy to use is different. In a general self-checkout device, a camera and a printer are installed at a height at which most people are assumed to find it easy to use, and only one type is sold as a product in reality.

It is thus preferable to provide a self-checkout device capable of realizing an arrangement with good usability without limiting operators.

DETAILED DESCRIPTION

A self-checkout device of an embodiment includes a bagging stand, a pair of pillars, a beam, a user interface terminal, and one or more brackets. The bagging stand includes a table and a scale that weighs a load placed on the table. The pair of pillars is installed on the bagging stand with a longitudinal direction thereof oriented vertically, and at least one outer surface of the pair of pillars is configured with a split exterior member that is splittable into a plurality of pieces in the longitudinal direction. The beam connects upper ends of the pillars. The user interface terminal is mounted on the beam. The one or more brackets receive attachment of an external device, and the bracket is positionally interchangeable with a part of the split exterior member.

Figure 1:
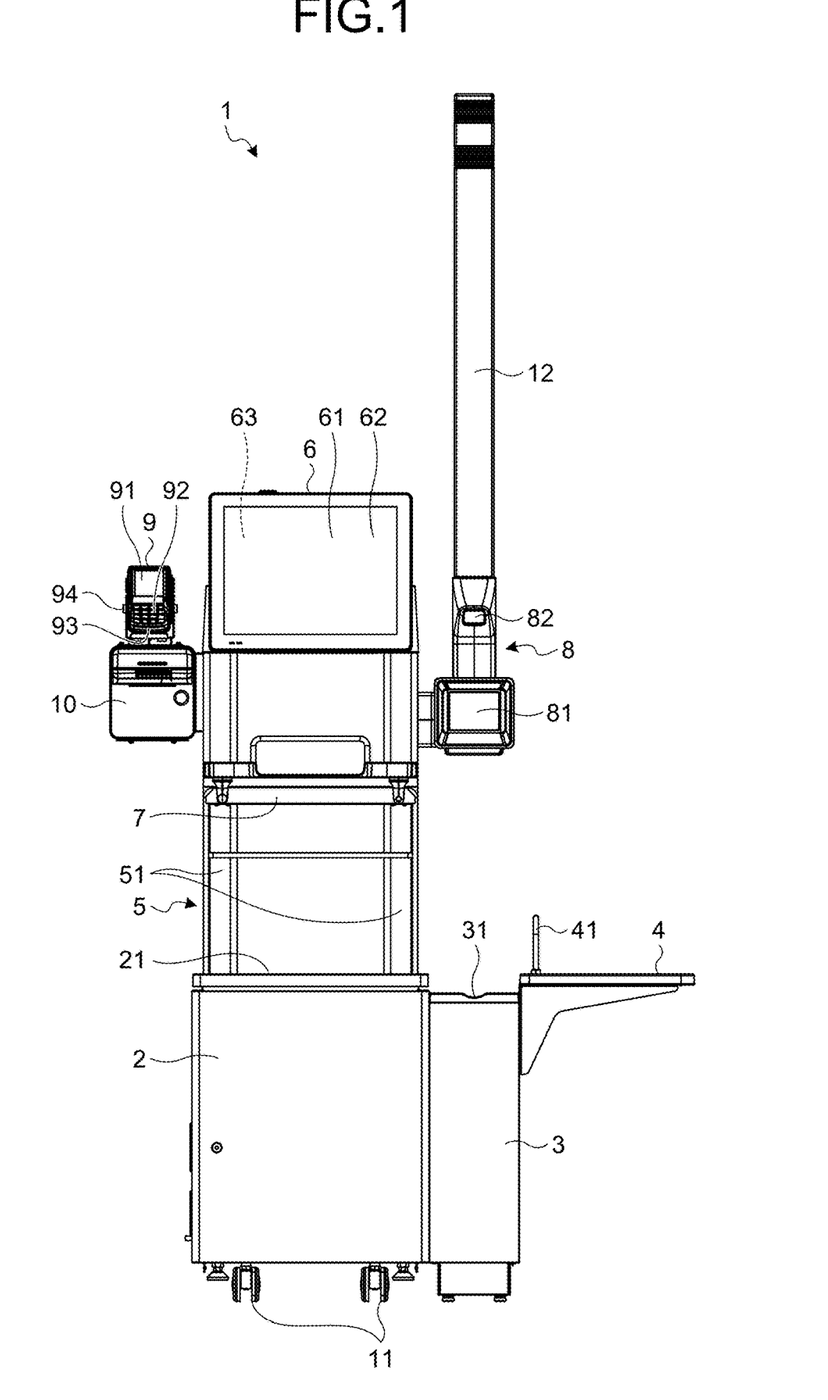
FIG. 1 is a front view of a self-checkout device according to an embodiment.
Figure 2:
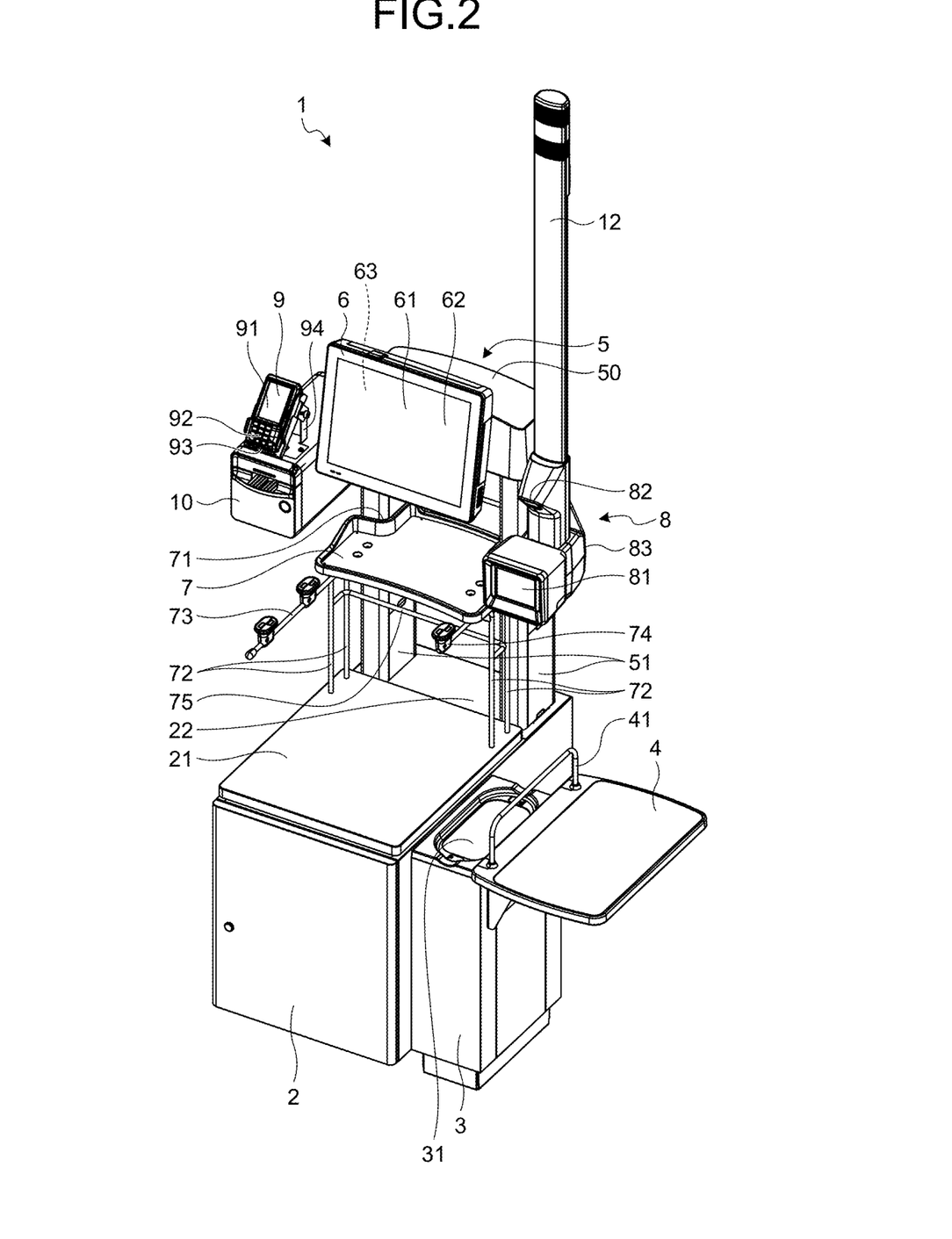
FIG. 2 is a perspective view of the self-checkout device.

An embodiment will be described with reference to the drawings. FIG. 1 is a front view of a self-checkout device 1 according to the embodiment. FIG. 2 is a perspective view of the self-checkout device 1. The self-checkout device 1 includes a bagging stand 2, an auxiliary stand 3, a basket table 4, a gate-shaped frame 5, a user interface (UI) terminal 6, a temporary placement table 7, a reader 8, a payment terminal 9, a printer 10, casters 11, and a warning lamp 12. The reader 8 and the printer 10 are examples of external devices.

The bagging stand 2 is provided with a built-in scale for weighing a load placed on a table 21. The table 21 is a most part of an upper surface of the bagging stand 2 except for a part located at the back of the upper surface (non-weighing area 22). The bagging stand 2 supports the gate-shaped frame 5 in the non-weighing area 22.

The gate-shaped frame 5 includes a pair of pillars 51 and a beam 50 connecting upper ends of the pillars 51. Each of the pair of pillars 51 is installed in the non-weighing area 22 with its longitudinal direction oriented vertically (i.e., upright). The pillars 51 are respectively located near left and right edges of the non-weighing area 22, and a distance between the pillars 51 is large. As a result, the gate-shaped frame 5 is easily stabilized, and a space above the non-weighing area 22 is open to improve visibility.

The auxiliary stand 3 is arranged beside bagging stand 2. A height of the auxiliary stand 3 is slightly lower than a height of the table 21. A handy-type code reader placement area 31 recessed in an oval shape is provided on an upper surface of the auxiliary stand 3.

The basket table 4 is a table for placing a shopping basket provided in a supermarket or the like. The basket table 4 is arranged at a position to interpose the auxiliary stand 3 between the basket table 4 and the bagging stand 2, and is attached to an upper side surface of the auxiliary stand 3. Further, a wire holder 41 is provided at an edge of the basket table 4 on the side of the auxiliary stand 3, so as to prevent deviation of a shopping basket placed on the basket table 4.

With the arrangement as described above, the auxiliary stand 3 functions to provide a predetermined space between the bagging stand 2 and the basket table 4.

The temporary placement table 7 is provided on the table 21. The temporary placement table 7 includes a cutout portion 71, a pair of legs 72, bag hooks 73 and 74, and a beam 75.

The temporary placement table 7 has a shape in which both back-side corners of a square tray are recessed to form a pair of cutout portions 71, and a portion between the cutout portions 71 is sandwiched between the pair of pillars 51 of the gate-shaped frame 5.

Each of the legs 72 is formed by combining a plurality of wire pillars. The legs 72 respectively stand near the left and right edges at the back of the upper surface of the table 21, so that placement of a luggage on the table 21 is hardly hindered Both legs 72 support the vicinities of the left and right edges of a bottom surface of a portion to the front of the cutout portions 71 of the temporary placement table 7. As a result, a dimension of the temporary placement table 7 in a width direction is substantially equal to a dimension of the bagging stand 2 in the width direction. Thus, the temporary placement table 7 has a wider and larger area than a conventional temporary placement table.

The beam 75 reinforces the legs 72 by laterally connecting the wires configuring both the legs 72.

The bag hooks 73 and 74 are attached to a bottom surface of the temporary placement table 7 and protrude from the back to the front of the temporary placement table 7. The bag hook 73 and the bag hook 74 have different protrusion lengths. The bag hook 73 is a relatively long hook including two parts for hooking and supporting a handle or the like of a bag for taking back a product. The bag hook 74 is a relatively short hook including one part for hooking and supporting. The bag hook 74 with short length is attached to a side close to the basket table 4. As a result, it is possible to prevent hindering movement of the product from the shopping basket to inside of the bag on the table 21 via the reader 8.

The UI terminal 6 is mounted on the front surface of the beam 50 in a tiltable manner. The UI terminal 6 is a device for a user interface function, and includes a display unit 61, an operation unit 62, and a control unit 63. Note that the UI terminal 6 may further include a communication interface or the like for communicating with an external device such as a speaker, a buzzer, or a store server.

The display unit 61 is a display device such as a liquid crystal monitor, and displays information for an operator (customer or salesclerk). In addition, the display unit 61 changes a screen to reflect the operation that the operation unit 62 has received. The operation unit 62 is an operation device such as a touch panel, and is stacked and arranged on the surface of the display unit 61 to receive an operation according to information displayed on the display unit 61.

The control unit 63 is built in a housing of the UI terminal 6. The control unit 63 includes a central processing unit (CPU), a read only memory (ROM), and a random access memory (RAM), and integrally controls the reader 8 and the payment terminal 9 connected to the UI terminal 6, the printer 10, the scale built in the bagging stand 2, and the like in addition to the display unit 61 and the operation unit 62.

The reader 8 includes a camera 81 and a scanner 82. Each of the camera 81 and the scanner 82 reads a code symbol such as a barcode or a two-dimensional code. The camera 81 includes an image sensor (imaging element) behind a window on the front surface of the housing, acquires an image of a product by imaging, and cuts out a code symbol from the image captured. Note that the camera 81 may correspond to object recognition for extracting a feature amount of a product from a captured image and specifying the product.

The reader 8 is arranged above the auxiliary stand 3. Thus, the reader 8 is positioned on (or near) a movement locus of the product moving from the basket table 4 to the bagging stand 2. This contributes to improvement in workability of product registration by the operator.

The scanner 82 is an auxiliary component of the camera 81 and is arranged above the camera 81. The scanner 82 is, for example, a conventionally and generally used barcode reader that reads a barcode on an upper surface of a product from above.

The warning lamp 12 is provided with a plurality of color illuminations at the upper end of a pole-shaped component erected substantially vertically so as to be visible from a distance. For example, when some kind of malfunction occurs in the self-checkout device 1, a color corresponding to the situation is illuminated.

The payment terminal 9 is a terminal device for making payment by a credit card or electronic money, and includes a display unit 91, an operation unit 92, and a reader/writer 93. The payment terminal 9 is supported by a rack 94 fixed onto an upper surface of a housing of the printer 10.

The printer 10 issues a receipt or the like for the payment made by the self-checkout device 1 according to an instruction output by the control unit 63.

The casters 11 are attached to a bottom surface of the bagging stand 2 to help the bagging stand 2 move on a floor.

Figure 3:
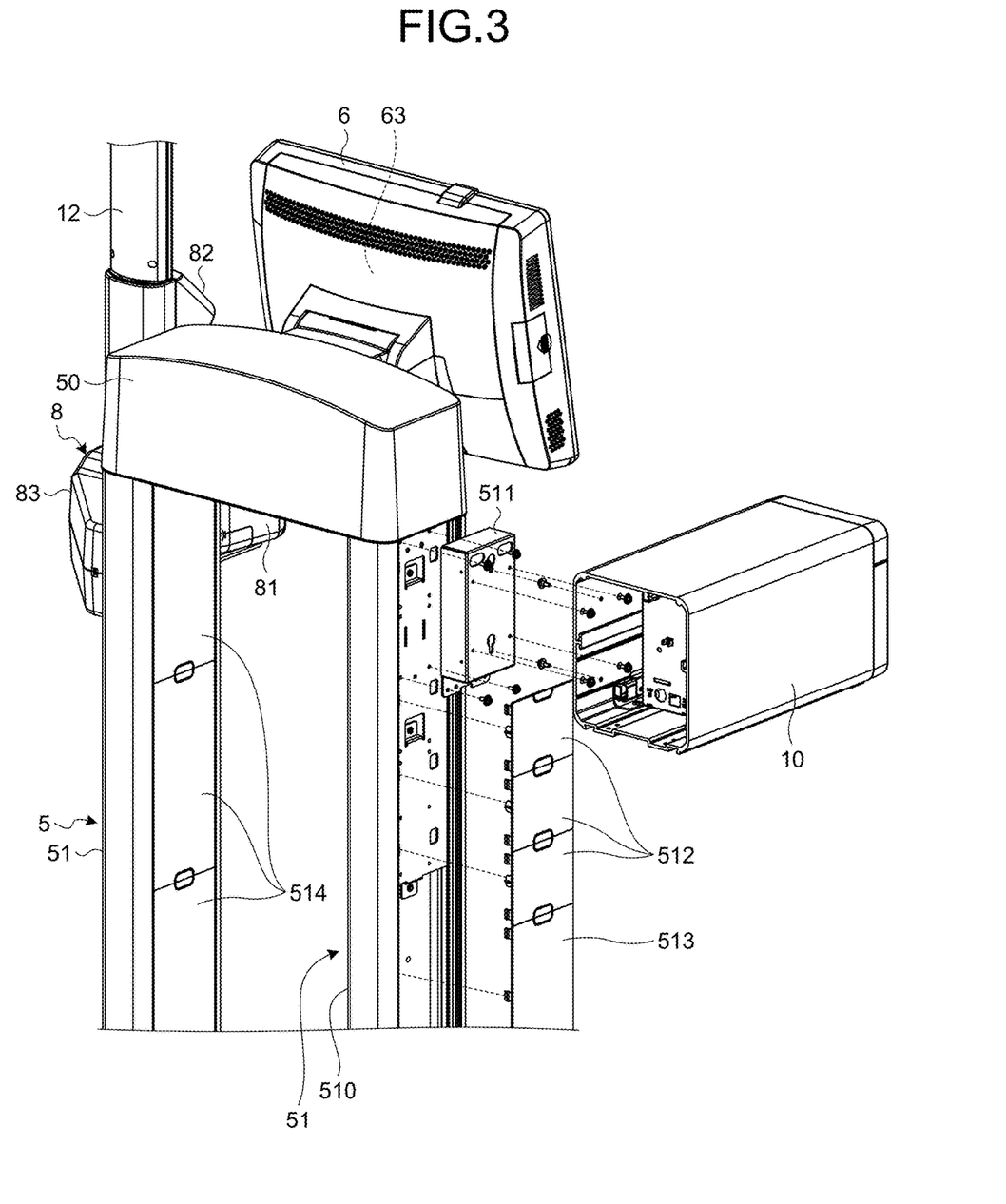
FIG. 3 is a perspective view of the self-checkout device seen from the right back, and is a view illustrating a mounting structure of a printer support.

FIG. 3 is a perspective view of the self-checkout device 1 seen from the right back, and is a view illustrating a mounting structure of a printer support 511. The printer support 511 receives attachment of an external device, and supports the printer 10.

First, the pillar 51 includes a bar-like hollow member 510, the printer support 511 that is a box-shaped member, and plate-shaped members 512 to 514. The hollow member 510 has a shape in which two surfaces, i.e., a surface facing the other pillar 51 and a surface opposite to the surface, are open.

The printer support 511 and the plate-shaped members 512 to 514 configure at least one outer surface of the pillar 51. The plate-shaped members 512 to 514 are an example of a split exterior member that can be split into a plurality of pieces in the longitudinal directions. The printer support 511 is an example of a bracket, and its position is interchangeable with any of the plate-shaped members 512 to 514.

The printer support 511 and the plate-shaped members 512 and 513 are fitted into two open surfaces of the hollow member 510. In other words, an opening of the hollow member 510 is closed by the printer support 511 and the plate-shaped members 512 to 514. A difference between the plate-shaped members 512, 513, and 514 is a length dimension in a direction corresponding to the longitudinal direction of the hollow member 510.

The printer support 511 is combined with the plate-shaped members 512 to 514 to configure an outer surface of the pillar 51. The printer support 511 and the plate-shaped members 512 to 514 are fixed onto the hollow member 510 with screws or the like. With this structure, the pillar 51 supports the printer 10 in a manner that the installation height of the printer 10 can be arbitrarily changed.

Figure 4:
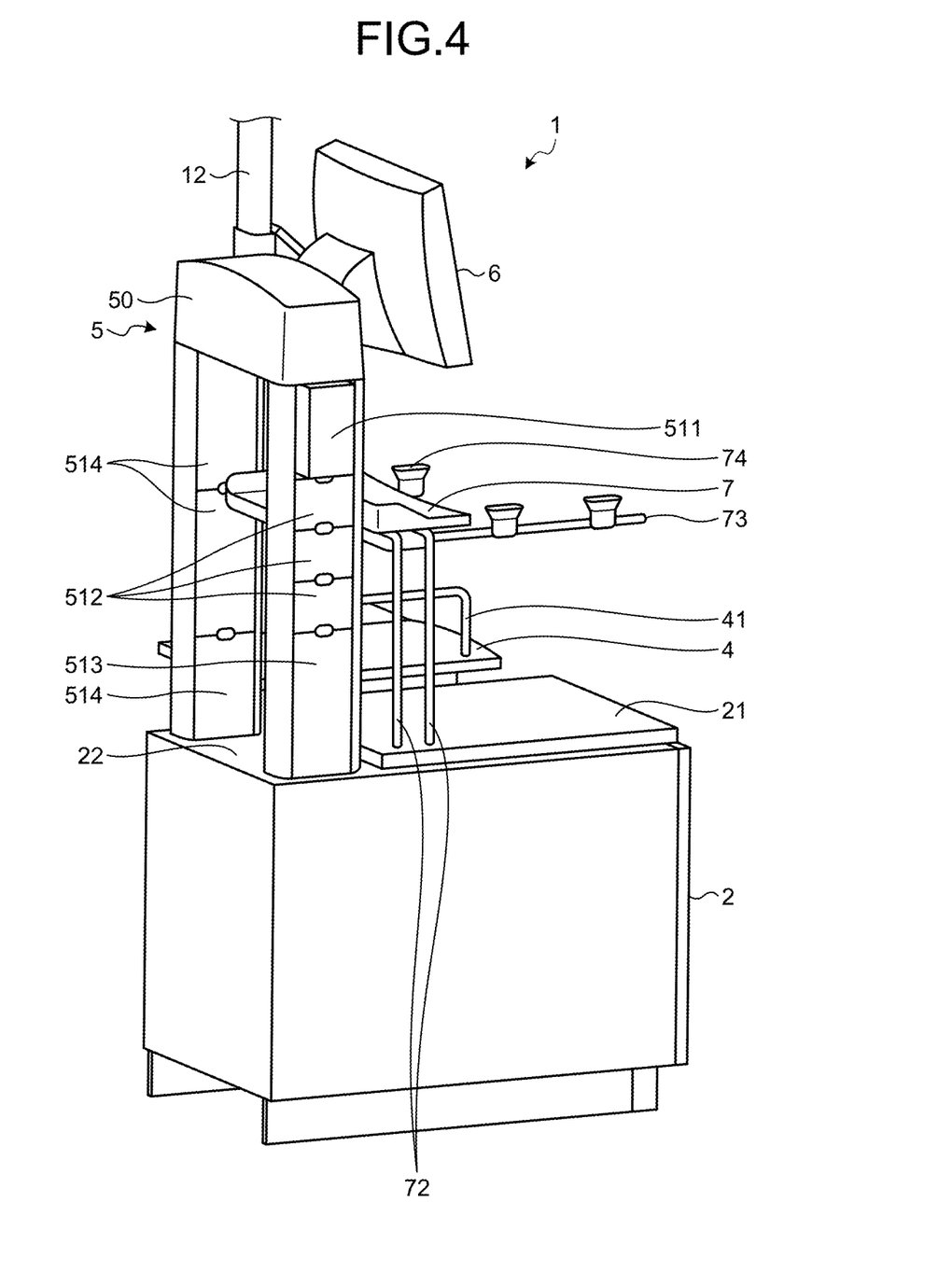
FIG. 4 is a diagram illustrating a state in which the printer support is at a highest position.
Figure 5:
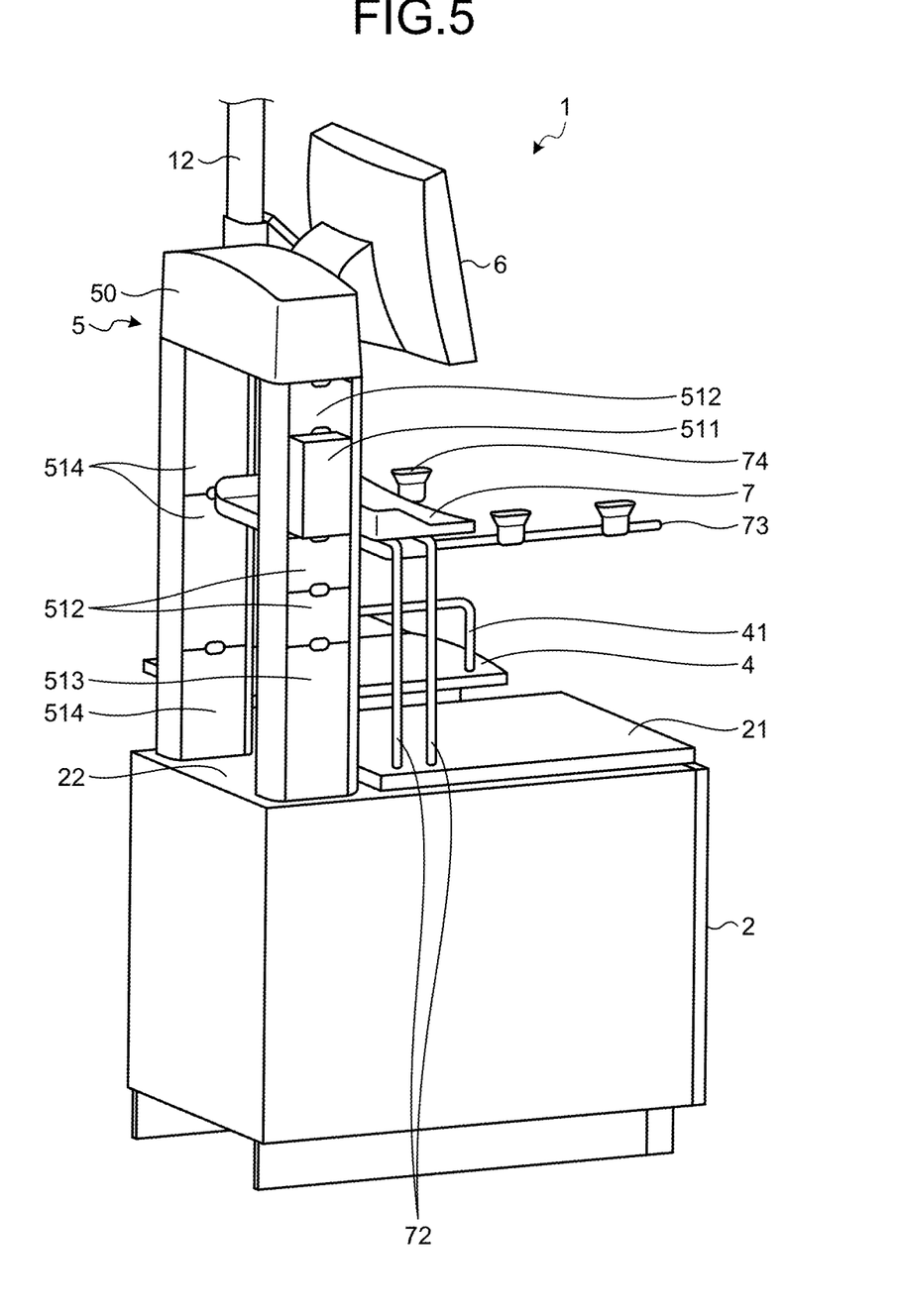
FIG. 5 is a diagram illustrating a state in which the printer support is at a second highest position.

FIG. 4 is a diagram illustrating a state in which the printer support 511 is at the highest position. FIG. 5 is a diagram illustrating a state in which the printer support 511 is at a second highest position. As illustrated in these drawings, the installation height of the printer support 511 can be changed along the longitudinal direction of the pillar 51 (vertical direction of the self-checkout device 1) by changing an arrangement order of the printer support 511 and the plate-shaped members 512 to 514.

Figure 6:
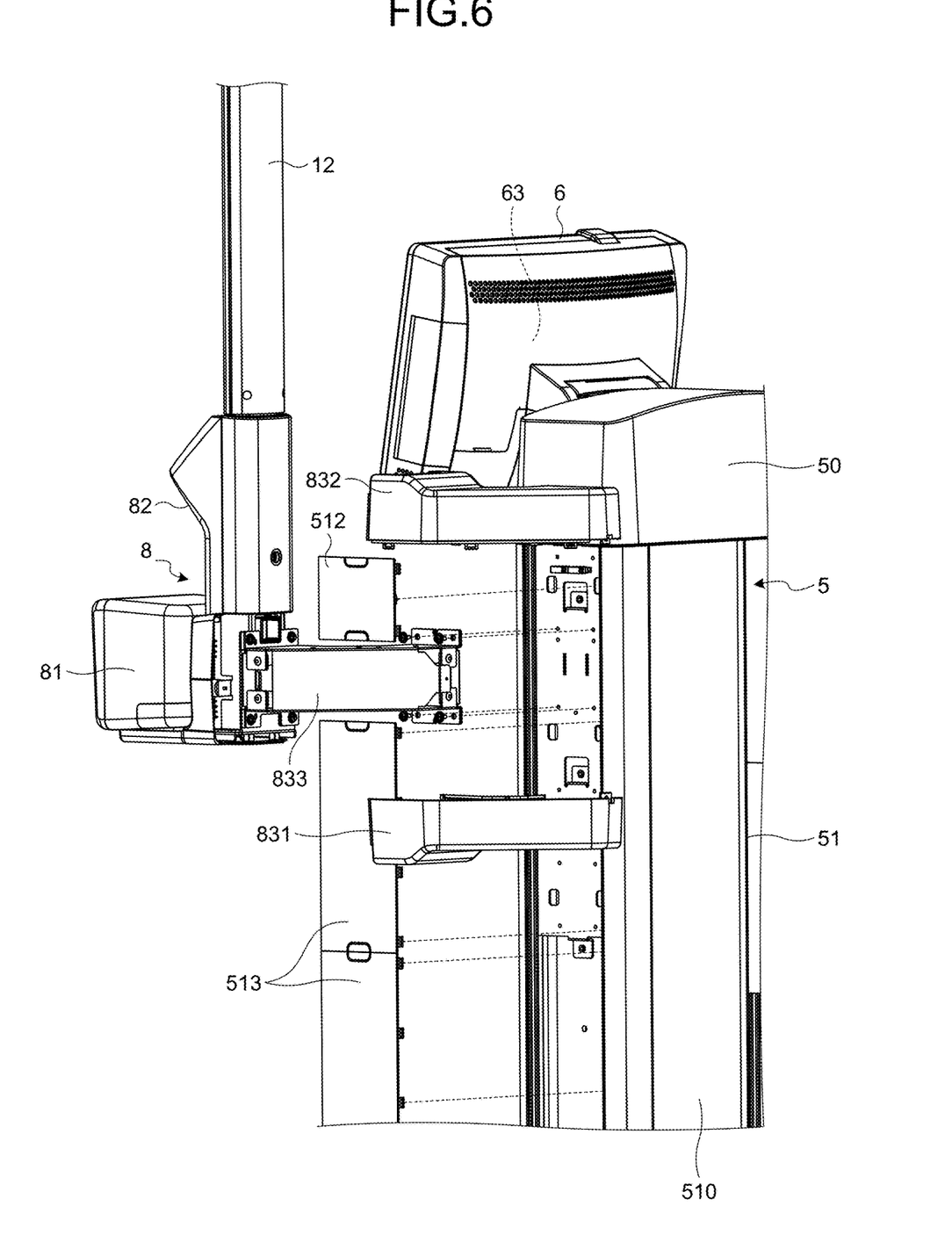
FIG. 6 is a perspective view of the self-checkout device seen from the left back, and is a view illustrating a mounting structure of a scanner support.

FIG. 6 is a perspective view of the self-checkout device 1 seen from the left back, and is a view illustrating a mounting structure of a scanner support 83. The scanner support 83 supports the camera 81, the scanner 82, and the warning lamp 12.

The scanner support 83 includes a lower cover 831, an upper cover 832, and a bracket 833. The lower cover 831 and the upper cover 832 cover the bracket 833 from top and bottom. One end portion of the bracket 833 is attached to the hollow member 510, and the other end portion is attached to a rear surface of a lower end portion of the warning lamp 12. The camera 81 is attached to a front surface of the lower end portion of the warning lamp 12. In addition, the scanner 82 is attached above the position of the camera 81 attached to the warning lamp 12.

Similarly to the printer support 511, the scanner support 83 is combined with the plate-shaped members 512 to 514 to configure a part of an outer surface of the other pillar 51.

As a result, the pillar 51 supports the reader 8 and the warning lamp 12 in a manner that the installation height of the reader 8 can be arbitrarily changed.

However, for convenience of workability when product information is read, the reader 8 is desirably installed at a position higher than an edge of the shopping basket placed on the basket table 4, and the product that has passed through the front of the camera 81 is desirably at a position higher than the bag hooks 73 and 74. For this reason, it is considered that the reader 8 is hardly attached at a position near a lower end portion of the pillar 51. Therefore, a structure for receiving the bracket 833 on the inner side of the hollow member 510 may be omitted at a position near the lower end.

In the self-checkout device 1 having the above structure, a shopping customer hooks the handle of the bag for taking back the product on, for example, the bag hooks 73 and 74 on the bagging stand 2. Next, the customer takes out a product from the shopping basket placed on the basket table 4 to read a barcode or the like on the product surface with the reader 8, and put the product in the bag on the bagging stand 2 while checking the UI terminal 6.

The scale in the bagging stand 2 weighs a load applied to the table 21, and outputs a weight of the load to the control unit 63. The control unit 63 receives an output of the reader 8, registers the product information, and collates the information with the output of the scale. In addition, the control unit 63 receives payment for the product from the customer via the UI terminal 6 and the payment terminal 9. Then, the control unit 63 outputs, from the printer 10, a receipt on which details of transaction are indicated.

To adjust the height of the printer 10, the printer support 511 and the plate-shaped members 512 to 514 are removed from the hollow member 510, and their vertical order is changed to achieve a desired installation height of the printer support 511. Then, the printer support 511 and plate-shaped members 512 to 514 are fixed onto the hollow member 510 again.

Similarly, to adjust the height of the reader 8, the scanner support 83 and the plate-shaped members 512 to 514 are removed from the hollow member 510, and their vertical order is changed to achieve a desired installation height of the scanner support 83. Then, the scanner support 83 and the plate-shaped members 512 to 514 are fixed onto the hollow member 510 again.

As described above, according to the self-checkout device 1 of the present embodiment, the installation height can be changed in the structure (e.g., reader 8 and printer 10) when a user-friendly height differs by customer's height and the like and is not limited to one. As a result, for example, when a plurality of self-checkout devices 1 is installed in a store, it is possible to install the self-checkout device 1 with high positions for the reader 8, the printer 10, and the like and the self-checkout device 1 with low positions as appropriate according to customers' tendency.

As described above, according to the present embodiment, it is possible to provide a self-checkout device capable of realizing the arrangement with good usability without limiting the operators.

Figure 7:
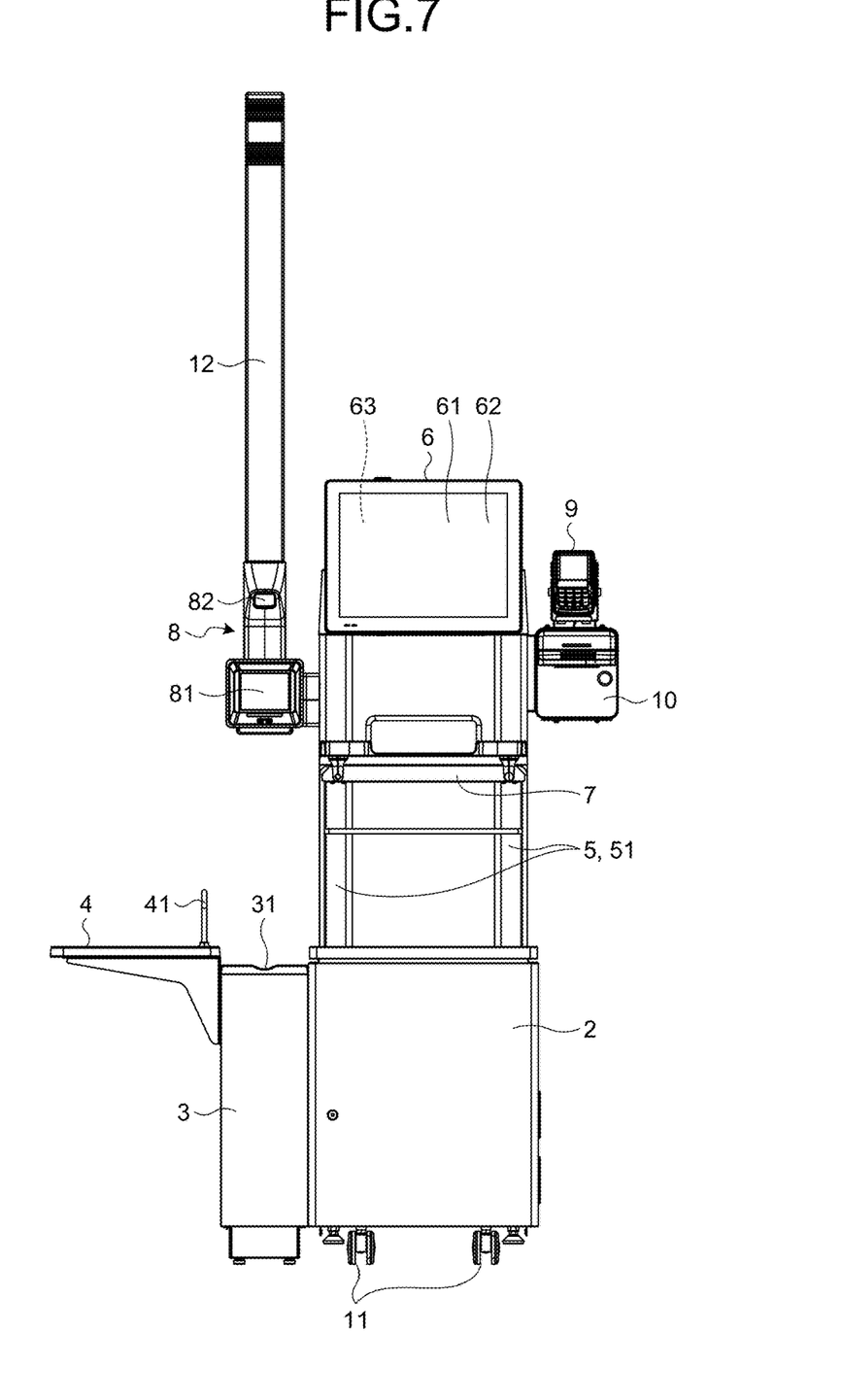
FIG. 7 is a front view of the self-checkout device in a changed state of a left-right interchangeable structure.
Figure 8:
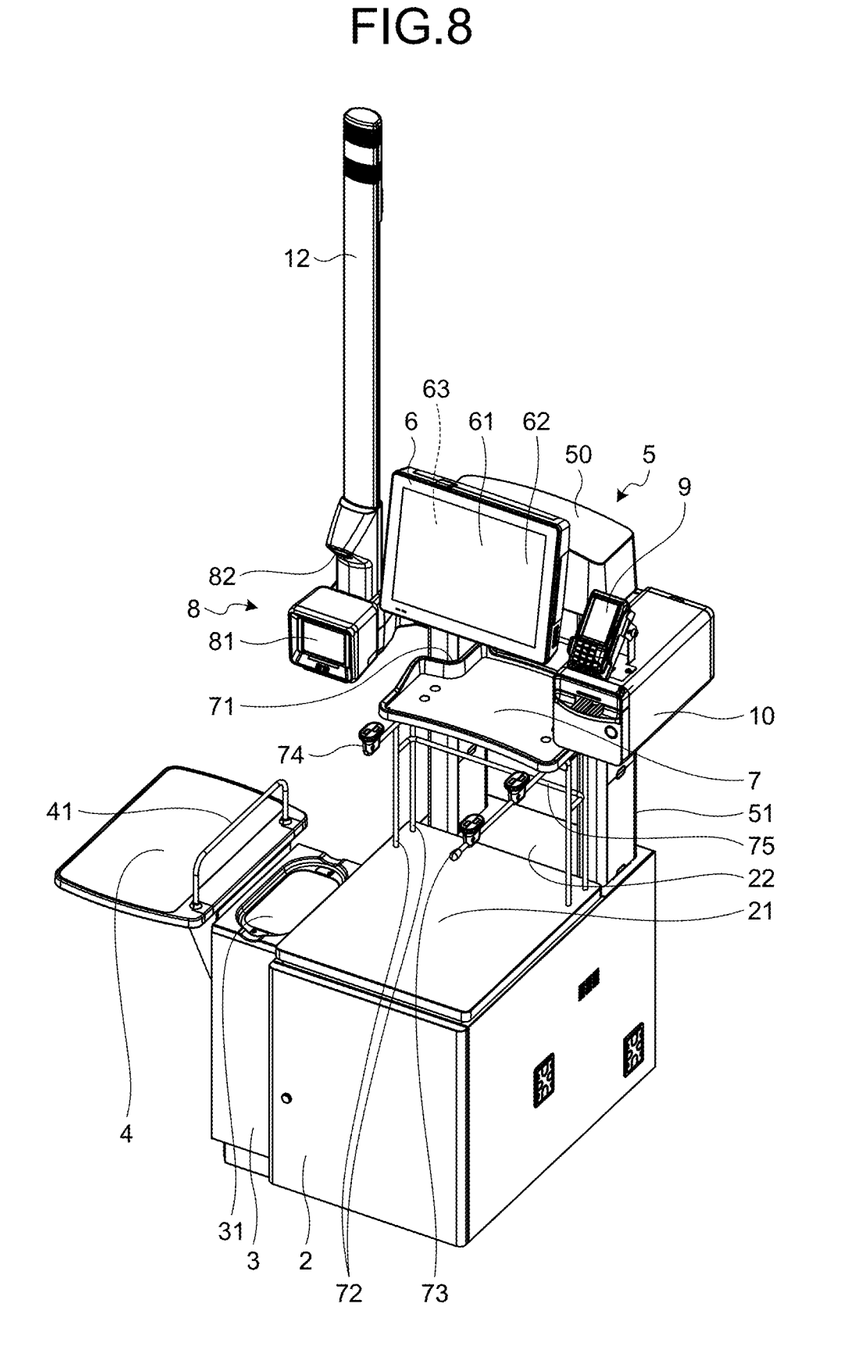
FIG. 8 is a perspective view of the self-checkout device in the changed state of the left-right interchangeable structure.

Note that the self-checkout device 1 can interchange the left and right structural arrangements according to, for example, an assumed moving direction of a customer who will be an operator. FIGS. 7 and 8 are a front view and a perspective view of the self-checkout device 1 in a changed state of a left-right interchangeable structure.

For example, the reader 8 and the printer 10 have the left-right interchangeable structure. Further, for example, the bag hook 73 and the bag hook 74 can also be interchanged between left and right. Further, the auxiliary stand 3 may also be installed on an opposite side portion of the bagging stand 2. The basket table 4 may also be attached to an opposite side portion of the auxiliary stand 3.

As described above, since the left-right interchangeable structure is provided for an arrangement whose good usability differs by the moving direction of the customer, the arrangement is adjusted according to the moving direction of the customer at the installation position of the self-checkout device 1. As a result, the usability can be improved.

Although some embodiments of the present invention have been described, these embodiments have been presented as examples, and are not intended to limit the scope of the invention. These novel embodiments can be implemented in various other forms, and various omissions, substitutions, changes, and combinations can be made without departing from the gist of the invention. These embodiments and modifications thereof are included in the scope and gist of the invention, and are included in the invention described in the claims and the equivalent scope thereof.

What is claimed is:

1. A self-checkout device comprising:
   a bagging stand including a table and a scale for measuring a load placed on the table;
   a pair of pillars installed on the bagging stand with a longitudinal direction of the pair of pillars oriented vertically;
   a beam configured to connect upper ends of the pair of pillars;
   a user interface terminal mounted on the beam; and
   one or more brackets configured to receive attachment of an external device, wherein
   the pair of pillars are installed on an upper surface of the bagging stand at horizontal ends of a non-weighing area located in a further back side than the table,
   the pair of pillars have respective first surfaces opposing each other and respective second surfaces opposite to the first surfaces,
   the first surfaces and the second surfaces are formed by vertically combining the one or more brackets and a plurality of kinds of split exterior members together such that an order of arrangement of the one or more brackets and the plurality of kinds of split exterior members is changeable, the plurality of kinds of split exterior members differing in dimension in the longitudinal direction, and
   each of the one or more brackets forms a part of the second surfaces such that the external device attached to the bracket is located outside the table.

2. The self-checkout device according to claim 1, wherein the bracket is provided on each of the pair of pillars, and the brackets are positionally interchangeable with each other.

3. The self-checkout device according to claim 1, further comprising a pair of bag hooks provided above the table to support a handle of a bag for taking back a product, one of the pair of bag hooks being formed shorter than another of the pair of bag hooks, the pair of bag hooks being positionally interchangeable with each other.

4. The self-checkout device according to claim 1, further comprising a temporary placement table installed on the table, at least a part of the temporary placement table being located at a position sandwiched by the pair of pillars.

5. The self-checkout device according to claim 1, further comprising:
   a basket table on which a shopping basket is placed; and
   an auxiliary stand that provides a predetermined space between the bagging stand and the basket table, wherein
   the bracket is provided above the auxiliary stand, and a reader for reading product information is mounted on the bracket.

* * * * *